US006982844B2

(12) United States Patent
Rettner et al.

(10) Patent No.: US 6,982,844 B2
(45) Date of Patent: Jan. 3, 2006

(54) OPTICAL APERTURE FOR DATA RECORDING HAVING TRANSMISSION ENHANCED BY SURFACE PLASMON RESONANCE

(75) Inventors: Charles T. Rettner, San Jose, CA (US); Barry C. Stipe, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 10/026,029

(22) Filed: Dec. 18, 2001

(65) Prior Publication Data

US 2003/0112542 A1 Jun. 19, 2003

(51) Int. Cl.
*G11B 5/02* (2006.01)
(52) U.S. Cl. ..................................... 360/59; 369/13.33
(58) Field of Classification Search .................. 360/59, 360/135; 428/694 R, 294 T; 369/13.33, 369/300, 121, 13.01, 44.23
See application file for complete search history.

(56) References Cited

U.S. PATENT DOCUMENTS

| | | | | |
|---|---|---|---|---|
| 5,199,090 A | * | 3/1993 | Bell | ............................ 369/300 |
| 5,625,617 A | * | 4/1997 | Hopkins et al. | ............ 369/121 |
| 5,689,480 A | * | 11/1997 | Kino | ............................ 369/14 |
| 5,729,641 A | * | 3/1998 | Chandonnet et al. | .......... 385/2 |
| 5,835,458 A | | 11/1998 | Bischel et al. | |
| 6,034,938 A | | 3/2000 | Heanue et al. | |
| 6,351,447 B1 | * | 2/2002 | Takagi et al. | .................. 360/48 |
| 6,408,118 B1 | * | 6/2002 | Ahuja et al. | .................. 385/37 |
| 6,414,911 B1 | | 7/2002 | Wilde et al. | |
| 6,614,960 B2 | * | 9/2003 | Berini | ......................... 385/39 |
| 6,623,874 B2 | * | 9/2003 | Kanbe et al. | .......... 428/694 TS |
| 6,798,729 B1 | | 9/2004 | Hurst, Jr. et al. | |
| 6,850,475 B1 | | 2/2005 | Heanue et al. | |
| 6,876,603 B2 | * | 4/2005 | Fuji et al. | ................ 369/13.13 |

* cited by examiner

*Primary Examiner*—David Hudspeth
*Assistant Examiner*—Glenda P. Rodriguez
(74) *Attorney, Agent, or Firm*—Daniel E. Johnson

(57) ABSTRACT

Electromagnetic radiation from an optical source is directed onto a metallic structure. The metallic structure in turn emits optical output from an emission region in the structure and onto a recording medium (e.g., a magnetic recording disk), thereby heating the medium. The output from the emission region is enhanced due to surface plasmons in the metallic structure. The surface plasmons are generated by an array of features (such as ridges or trenches) in the metallic structure and act to increase the emitted optical output from the emission region beyond what the emitted optical output from the emission region would be in the absence of these features. The apparatus and associated method are useful for data recording, e.g., thermally assisted data recording.

50 Claims, 16 Drawing Sheets

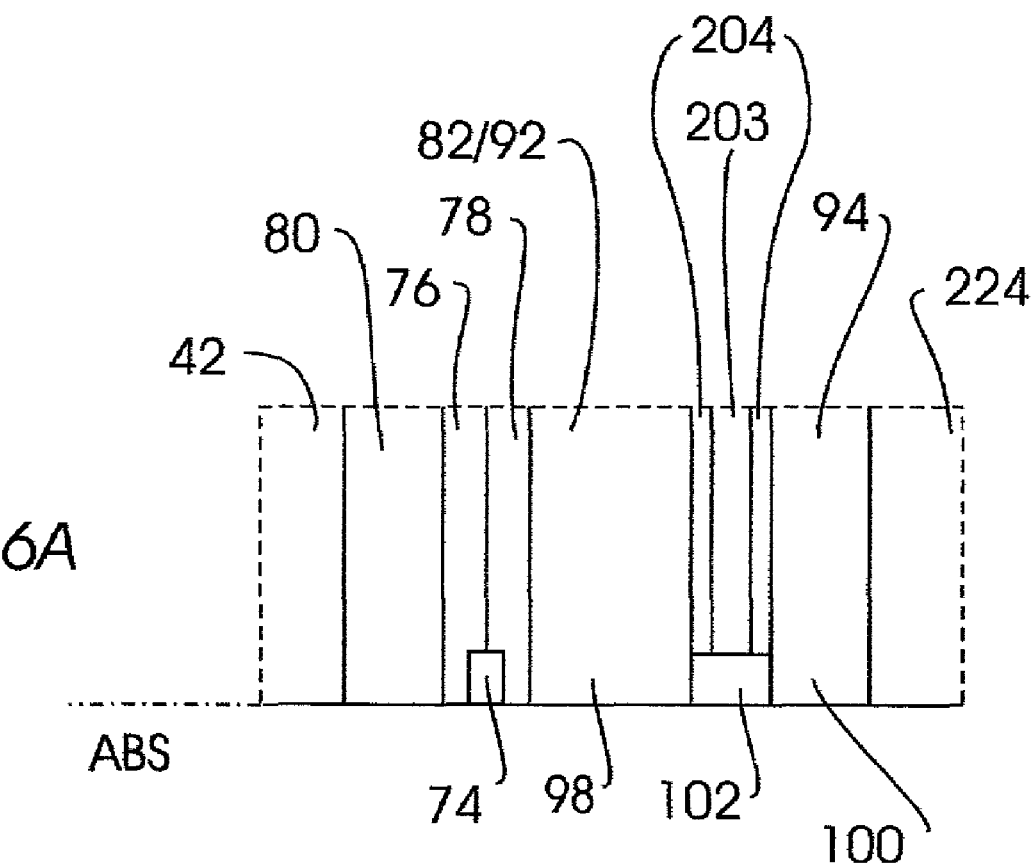

OPTICAL APERTURE FOR DATA RECORDING HAVING TRANSMISSION ENHANCED BY SURFACE PLASMON RESONANCE

TECHNICAL FIELD

The invention relates to thermally-assisted data recording, in which a region of a recording layer (e.g., a magnetic layer) is brought to an elevated temperature as part of the data recording process, and more particularly to near-field optical techniques for accomplishing this heating.

BACKGROUND

Magnetic recording disk drives store digital information by using a thin film inductive write head. The write head is patterned on the trailing surface of a slider that also has an air-bearing surface (ABS) to allow the slider to ride on a thin film of air above the surface of the rotating disk. The write head is an inductive head with a thin film electrical coil located between the poles of a magnetic yoke. When write current is applied to the coil, the pole tips provide a localized magnetic field across a gap that magnetizes the recording layer on the disk into one of two distinct magnetic states (binary data bits).

The magnetic material used as the recording layer on the disk is chosen to have sufficient coercivity that the magnetized data bits are written precisely and retain their magnetization state until written over by new data bits. The data bits are written in a sequence of magnetization states to store binary information in the drive, and the recorded information is read back with a read head that senses stray magnetic fields generated from the recorded data bits. Magnetoresistive (MR) read heads include those based on anisotropic magnetoresistance (AMR), giant magnetoresistance (GMR), such as the spin-valve type of GMR head, and the more recently described magnetic tunnel junction (MTJ) effect. Both the write and read heads are kept in close proximity to the disk surface by the slider's ABS, which is designed so that the slider "flies" over the disk surface as the disk rotates beneath the slider.

Disk drive areal data density (the number of bits that can be recorded on a unit surface area of the disk) is now approaching the point where the grains that define data bits are so small (with track widths of about 200 nanometers) that they can be demagnetized simply from thermal agitation within the magnetized bit (the so-called "superparamagnetic" effect). The conventional approach to circumventing this problem is to increase the magneto-crystalline anisotropy and coercivity of the magnetic material in the disk's recording layer to improve the thermal stability. This has required that the write head be made with materials having increasingly high saturation moments, thereby increasing the write field of the head so it can write on the high coercivity media. However, the saturation moment is limited by the available materials. Since coercivity is temperature dependent, one proposed solution is thermally-assisted magnetic recording (TAMR), in which the magnetic material in the recording media is locally heated during the writing process to near or above its Curie temperature so that the coercivity is reduced enough for writing to occur—at room temperature the coercivity is high enough that the recorded bits are thermally stable.

Several approaches to TAMR have been proposed, including the use of a laser beam to heat the magnetic recording layer, as described in "Data Recording at Ultra High Density", *IBM Technical Disclosure Bulletin*, Vol. 39, No. 7, July 1996, p. 237; "Thermally-Assisted Magnetic Recording", *IBM Technical Disclosure Bulletin*, Vol. 40, No. 10, October 1997, p. 65; and IBM's U.S. Pat. No. 5,583,727. A read/write head for use in a TAMR system is described in U.S. Pat. No. 5,986,978, wherein a special optical channel is fabricated adjacent to the pole or within the gap of a write head for directing laser light (or heat) down the channel. However, these technologies are generally limited to a magnetic grain size in the recording medium on the order of a wavelength of the light source.

Some recent scientific developments have underscored the dramatic optical behavior of metallic structures when surface electromagnetic resonances are excited. It had been thought that optical transmission through sub-wavelength apertures was exceedingly small, varying as $(d/\lambda)^4$ as first worked out theoretically by H. A. Bethe ("Theory of Diffraction by Small Holes", *The Physical Review*, vol. 66 (7–8), pp. 163–182, October 1944). Ebbessen et al. have described the use of sub-wavelength aperture arrays in a metal film to excite surface plasmons and enhance light transmission through the apertures. (See, for example, European Patent Application EP 1 008 870 to Ebbesen et. al., "Enhanced optical transmission apparatus utilizing metal films having apertures and periodic surface topography".) However, this work does not disclose structures useful for data recording. Other investigators have described the use of an aperture in a metal film on the face of a laser diode for producing a near-field optical spot for optical data recording. (See A. Partovi et al., "High-power laser light source for near-field optics and its application to high-density optical data storage", Applied Physics Letters, vol. 75, pp. 1515–1517, 13 Sep. 1999.) Although spot sizes of 250 nanometers were demonstrated, the absence of resonant structures is expected to result in relatively low transmission. Other researchers have investigated transmission resonances in waveguides and their relationship to periodic boundary conditions and film thickness (see J. A. Porto et al., "Transmission resonances on metallic gratings with very narrow slits," Physical Review Letters, vol. 83, no. 14, Oct. 4, 1999); still others have demonstrated that surface-enhanced transmission can be obtained from an individual aperture in a metal film in the presence of bumps or divots (see D. E. Grupp et al., "Beyond the Bethe Limit: Tunable enhanced light transmission through a single sub-wavelength aperture," Adv. Mater., 1999, vol. 11, pp. 860–862). There is still a need for a high intensity light (or heat) source that can be directed to a very small region of a data recording layer.

SUMMARY OF THE INVENTION

Preferred embodiments of the invention employ a physical phenomenon known to those skilled in the art as a "surface plasmon". As suggested by this term, a plasmon involves "plasma" consisting of electrons separated from ion cores in a conducting medium. This plasma can form a charge density wave, and when this wave is localized close to the surface of the conducting medium, the resulting excitation is termed a "surface plasmon". Incident electromagnetic radiation can excite a surface plasmon under certain resonance conditions (known as "modes") that conserve energy and momentum. Suitably positioned features (such as slits and ridges) facilitate the coupling of incident electromagnetic radiation to certain surface plasmon modes. The electromagnetic field of the excited surface plasmon then gives rise to optical output, which is then advantageously radiated away an emission region and may be directed onto, for example, a recording medium.

In one aspect of the invention, there is provided a method of directing electromagnetic radiation onto a data recording medium. The method includes providing a metal structure having an array of features and further includes directing optical radiation onto the array of features to generate at least one surface plasmon mode, thereby enhancing the optical output emanating from an emission region in the metal structure. The method also includes directing the optical output from the emission region onto a recording medium to facilitate the recording of data that is read back by a processor, such as a computer. A preferred implementation of the method further includes applying a magnetic field to the recording medium to write data into the recording medium. Another preferred implementation includes heating the recording medium with the optical output. The spacing between the features may be advantageously chosen to enhance, at a predetermined wavelength, the optical output emanating from the emission region. The method may be applied to a recording medium that is granular and has a grain size on the order of between 10 and 500 cubic nanometers, and more preferably between 10 and 250 cubic nanometers.

In another aspect of the invention, there is provided a method of directing electromagnetic radiation onto a recording medium. The method includes providing a metal structure having an array of features and directing optical radiation onto the array of features to generate at least one surface plasmon mode, with the (at least one) surface plasmon mode enhancing the effective transmission of the optical radiation through the metal structure. The method further includes directing optical output emanating from the metal structure onto a recording medium to heat the recording medium, thereby facilitating the recording of data. The data may then be read back with a processor, such as a computer. In a preferred implementation of the method, the transmission of the optical radiation through the metal structure is resonantly enhanced at a predetermined wavelength.

Another preferred embodiment of the invention is an apparatus for facilitating the recording of data that includes an optical source and a metallic structure that receives optical radiation from the source. The metallic structure emits optical output from an emission region in the structure, and the structure has an array of features that couple the radiation from one side of the structure to another side of the structure to increase the emitted optical output from the emission region beyond what the emitted optical output from the emission region would be in the absence of the features. The emitted optical output includes a near-field portion that extends from the emission region out to a distance less than the average wavelength of the emitted optical output. The apparatus further includes at least one element secured to the metallic structure, in which the (at least one) element generates magnetic fields for writing data in a data recording medium located within the near-field portion, as well as a platform to which the structure is secured (such as a slider). The platform is configured to be moved relative to a data recording medium while the separation between the emission region and a surface of the data recording medium is kept to less than the average wavelength.

Another aspect of the invention is a method of directing optical radiation onto a recording medium. The method includes providing a metal structure having an emission region and an array of features that enhance optical transmission through the emission region. The method further includes directing optical radiation onto the array of features, directing the optical output from the emission region onto a recording medium to facilitate the recording of data, and reading the recorded data with a processor (such as a computer).

Yet another aspect of the invention is a method of writing data. The method includes directing optical radiation onto a magnetic medium to heat a portion of the medium. The method further includes applying a magnetic field to the recording medium to write data into the recording medium, in which the recording medium has a grain size on the order of 10 to 500 cubic nanometers, and more preferably 10 to 250 cubic nanometers.

Preferred embodiments and implementations of the invention may be applied to a variety of technologies that record on a rigid surface (such as magnetic, phase-change, and chemical-change).

BRIEF DESCRIPTION OF THE DRAWINGS

FIG. 6A is an expanded view of a portion of the device shown in FIG. 6;

DETAILED DESCRIPTION OF THE INVENTION

Magnetic Disk Drive

Figure 1:
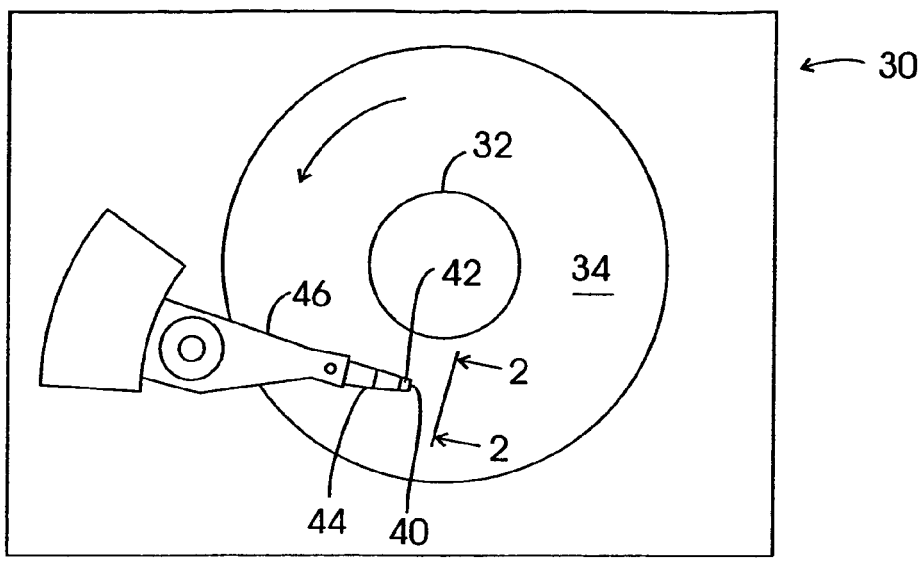
FIG. 1 is a planar view of an exemplary magnetic disk drive.
Figure 2:
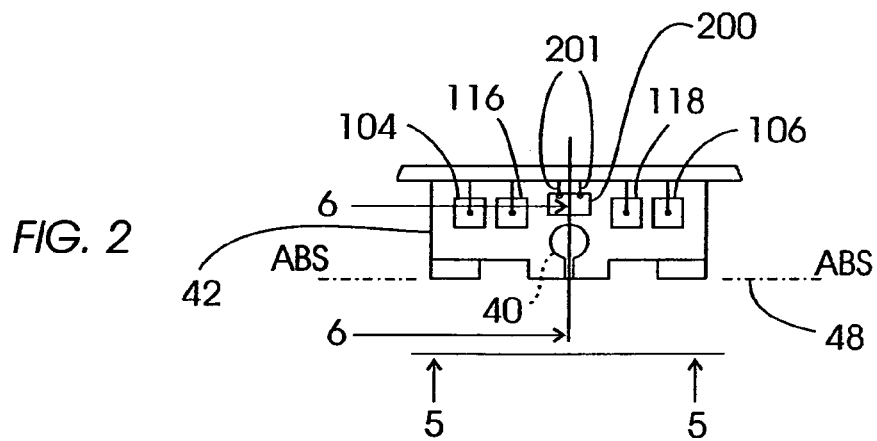
FIG. 2 is an end view of a slider with a magnetic head of the disk drive as seen in plane 2—2.
Figure 3:
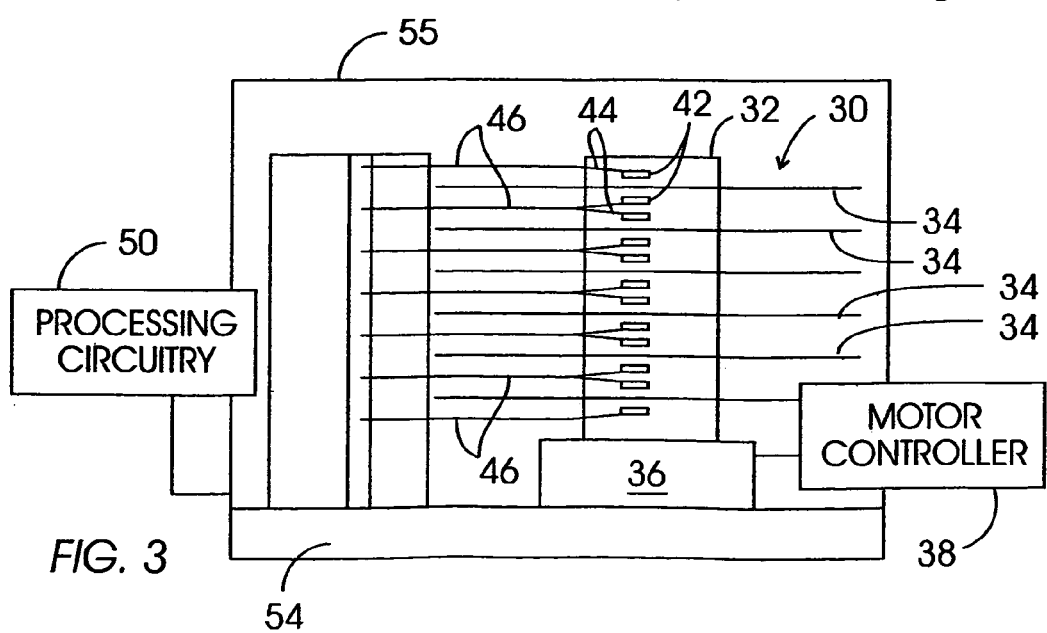
FIG. 3 is an elevation view of the magnetic disk drive wherein multiple disks and magnetic heads are employed.
Figure 4:
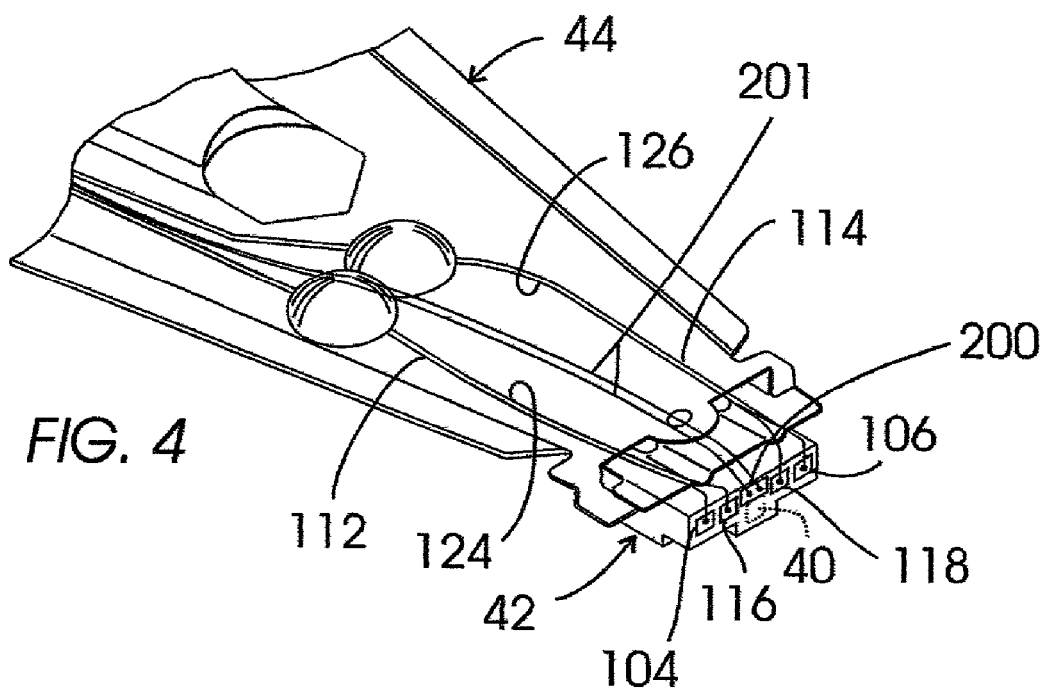
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36, the slider is supported on a thin (typically in the range of 5–20 nanometers, e.g., 15 nanometers) cushion of air between the surface of the disk 34 and an air bearing surface (ABS) 48 of the slider 42. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. The components described hereinabove may be mounted on a frame 54 of a housing 55, as shown in FIG. 3. In FIG. 4 the slider 42 is shown mounted to the suspension 44.

Figure 5:
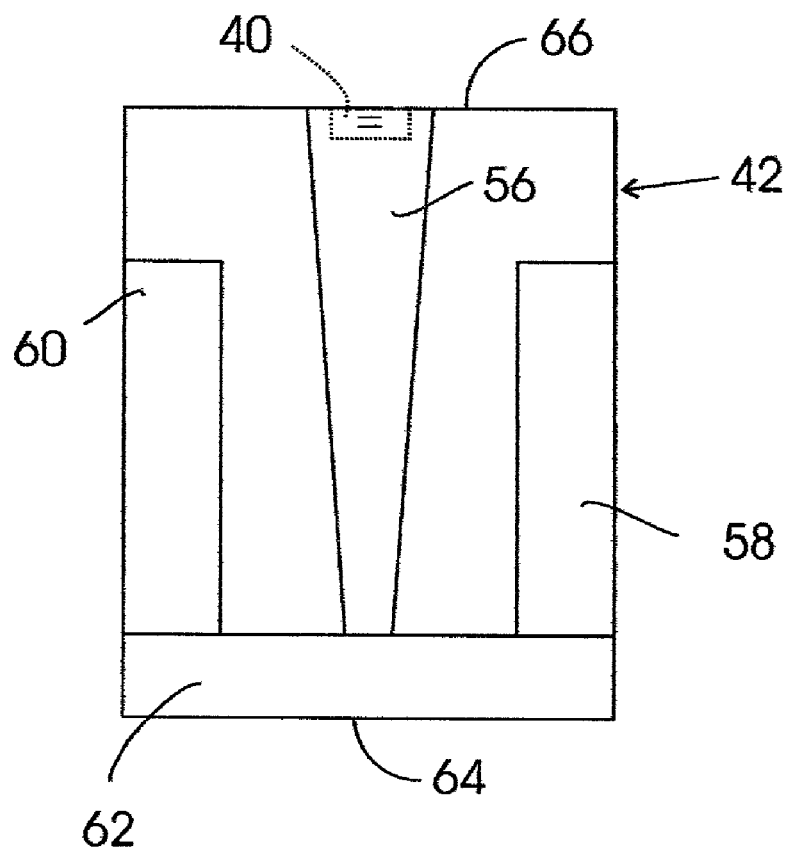
FIG. 5 is an ABS view of the slider taken along in plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
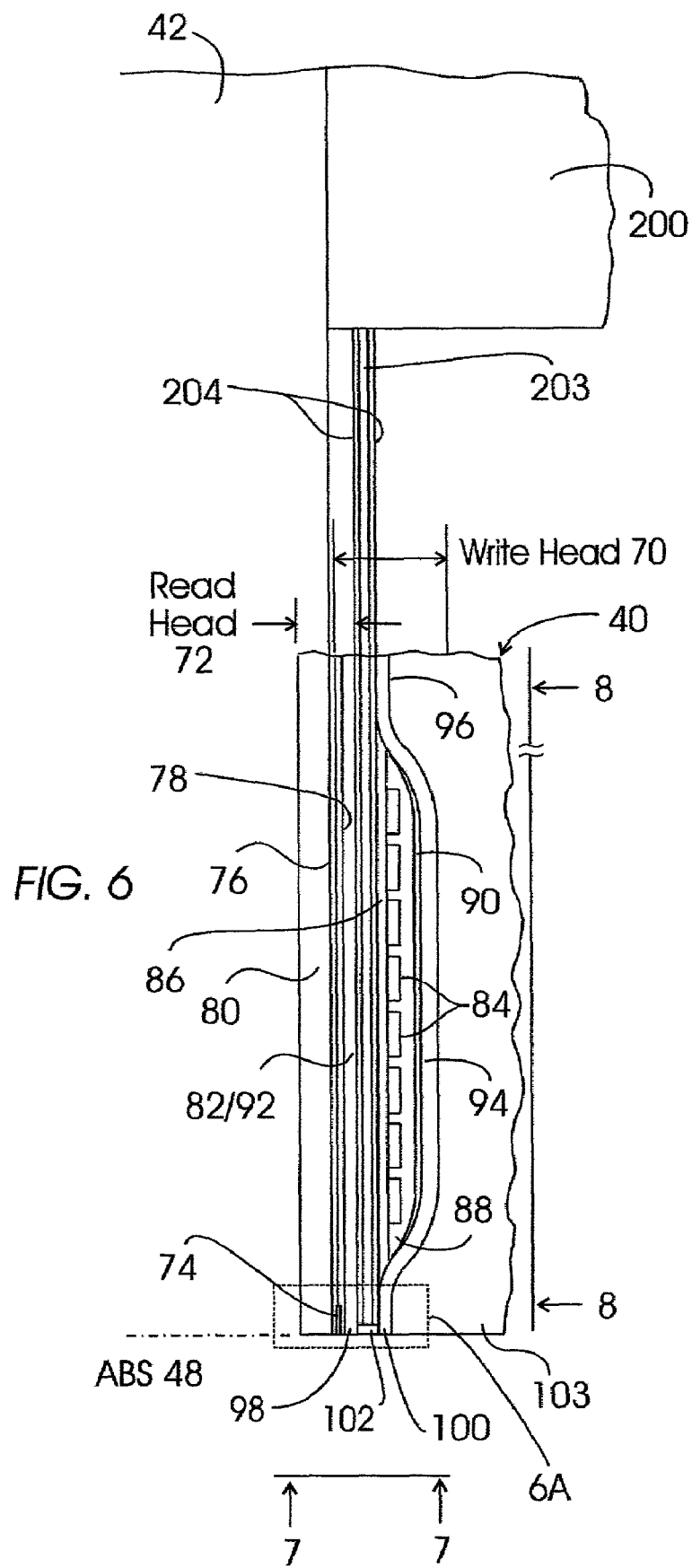
FIG. 6 is a partial view of the slider and magnetic head as seen in plane 6—6 of FIG. 2.
Figure 7:
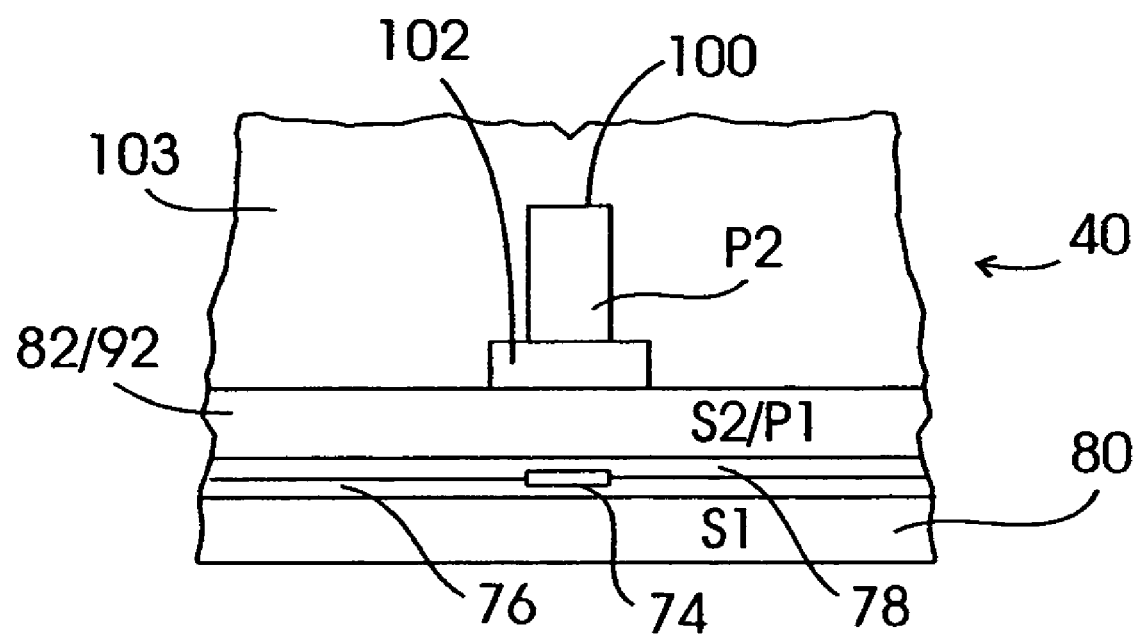
FIG. 7 is a partial ABS view of the slider taken along plane 7—7 of FIG. 6 to show the read and write elements of the magnetic head.

FIG. 6 is a side cross-sectional elevation view of the merged MR head 40, which includes a write head portion 70 and a read head portion 72, the read head portion employing a sensor 74. FIG. 7 is an ABS view of FIG. 6. The sensor 74 is sandwiched between first and second gap layers 76 and 78, and the gap layers are sandwiched between first and second shield layers 80 and 82. In response to external magnetic fields, the resistance of the sensor 74 changes. A sense current $I_S$ conducted through the sensor causes these resistance changes to be manifested as potential changes. These potential changes are then processed as readback signals by the processing circuitry 50 shown in FIG. 3.

As shown in FIG. 6, the write head portion of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a near-field resonance element 102 at the ABS 48. The resonance element 102 (described in greater detail below) directs electromagnetic radiation onto the magnetic disk 34. The read/write head 40 may be advantageously covered with an protective overcoat layer 103 such as aluminum oxide.

Figure 8:
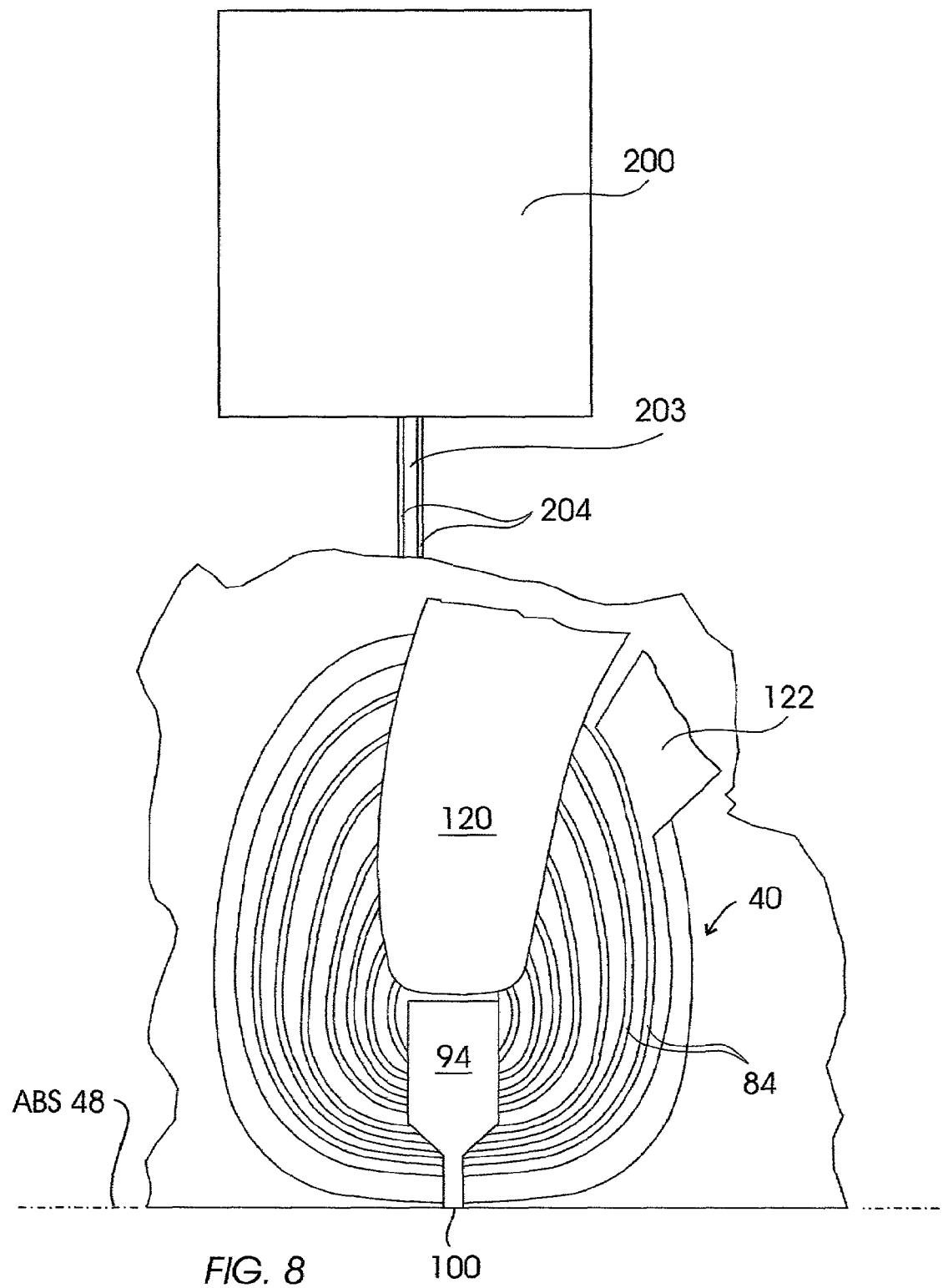
FIG. 8 is a view taken along plane 8—8 of FIG. 6 with all material above the write coil removed.

As suggested by FIGS. 2 and 4, first and second solder connections 104 and 106 connect leads (not shown) from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Preferred Embodiments Related to Surface Plasmon Enhanced Optical Transmission In FIG. 6, an optical source such as a laser diode 200 is shown secured to the slider 42. Optical output from the diode 200 is directed through a waveguide 203 surrounded by a cladding 204. The waveguide 203 and the cladding 204 (not shown in FIGS. 2 and 4 for clarity) pass through the read/write magnetic head 40 such that the optical output is directed onto the resonance element 102. FIGS. 2 and 4 show the laser diode 200 connected to leads 201, which in turn are connected to a power supply (not shown). The waveguide 203 and its cladding 204 are advantageously supported on the slider 42 and surrounded by protective material (not shown) such as alumina. Also, output from the laser diode 200 may be coupled into the waveguide 203 through a tapered optical element (not shown), such as those known to one skilled in the art.

Figure 9A:
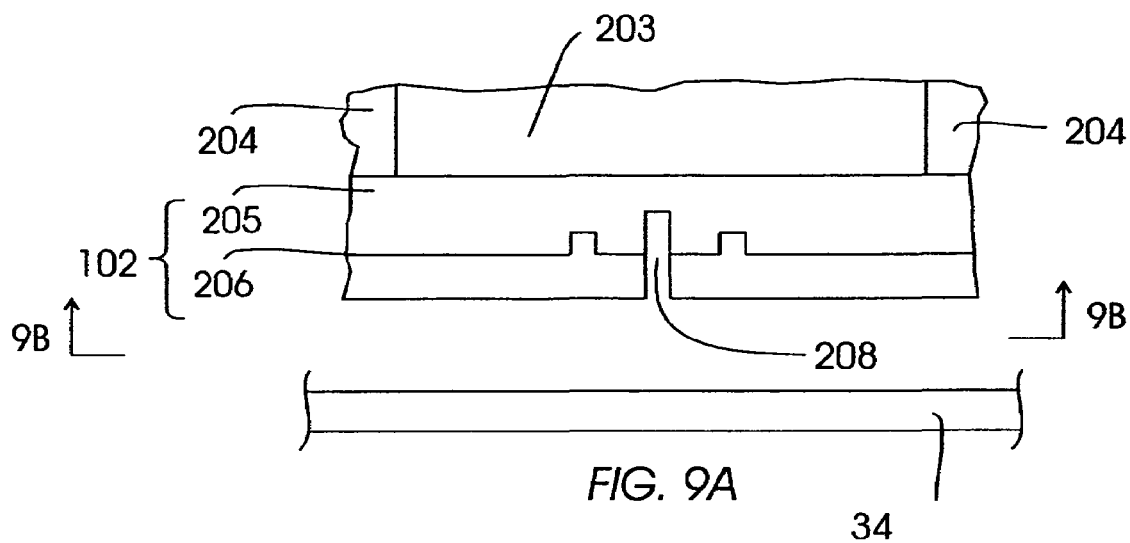
FIGS. 9A and 9B show a partial cross sectional end view and an ABS view, respectively, of an optical device that includes an optical resonance member having a periodic array of ridges in a metallic layer and a slit through which optical radiation is emitted.

An expanded view of the resonance element 102 and the components that surround it is shown in FIG. 6A. FIG. 9A is a partial cross sectional end view of a preferred resonance element 102 showing the resonance element 102 adjoining the waveguide 203 and the cladding 204 surrounding the waveguide. The resonance element 102 shown here includes dielectric material 205 that joins the waveguide 203/cladding 204 to a metallic layer 206. The metallic layer 206 includes a series (e.g., a periodic array) of ridges 207 that protrude into the dielectric material 205. (Alternatively, the ridges could be built into the waveguide 203 without using the dielectric material 205.) The metallic layer 206 further includes a slit 208 through which optical radiation from the waveguide 203 passes and is directed onto the magnetic disk 34. Using the preferred embodiments herein, track widths of 10–200 nanometers, and more preferably 20–100 nanometers (corresponding to slit width ranges of about 5–100 nanometers and about 10–50 nanometers, respectively), may be realized by appropriately choosing the dimensions of the emission region (shown here as a slit). Preferred materials for the metallic layers in the optical resonance elements described herein include Au, Ag, Cu, Al, and Cr. With respect to the slits herein, they may be optionally protected by filling them with dielectric material.

The metallic layers in the optical resonance elements herein may advantageously have a thickness in the range of 50–500 nanometers. The features herein (e.g., ridges and trenches) used to generate surface plasmons may advantageously have lengths of 100–1000 nanometers or greater, widths of 10–150 nanometers (more preferably 20–50 nanometers, e.g., about 35 nanometers), depths or heights of 20–300 nanometers (more preferably, 40–200 nanometers, e.g., 120 nanometers), a spacing between adjacent features of 250–900 nanometers (or 250–500 nanometers, e.g., 450 nanometers). The slits herein may advantageously have widths (at their narrowest point) in the range of 10–100 nanometers (more preferably 10–50 nanometers) and lengths on the order of or greater than approximately 0.5 times the average wavelength of the light source (e.g., 200–1000 nanometers). The dielectric layers herein may advantageously have a thickness chosen to optimize optical transmission. As used herein, the terms "light" and "optical" are intended to include visible, as well as invisible (e.g., ultraviolet and infrared) electromagnetic radiation.

Figure 9B:
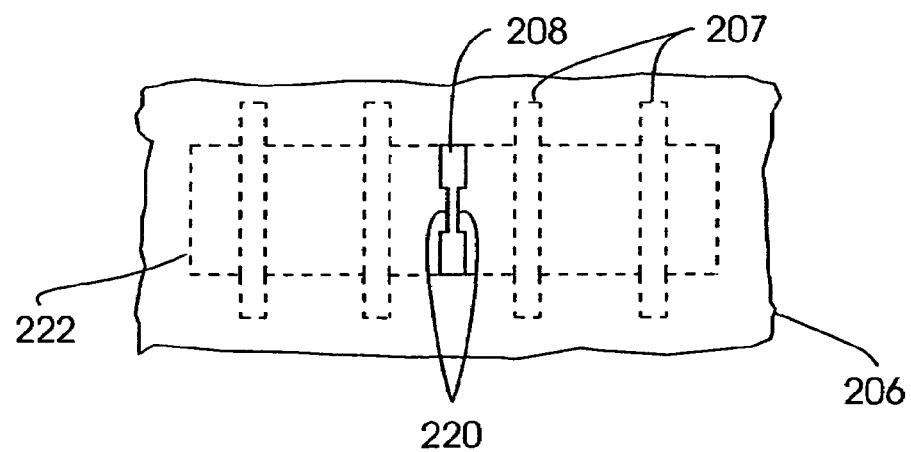

FIG. 9B shows the corresponding ABS view of the resonance element 102. The slit 208 in the metallic layer 206 may optionally include notches 220, as shown in FIG. 9B. A notch on one or both sides of the slit 208 serves to further narrow the track width and increase the intensity of the light due to an antenna effect. Since the waveguide 203, the cladding 204, and the ridges 207 are not visible when viewed from the disk 34, the ridges 207 and the waveguide/cladding interface 222 are shown here using dashed lines.

With respect to the device shown in FIGS. 6 and 6A, the various layers may be deposited using additive and subtractive lithographic techniques known to those skilled in the art. With respect to FIGS. 9A and 9B, the resonance element 102 may be advantageously constructed subsequent to the rest of the device by depositing layers onto the face of the device that becomes the air bearing surface.

Figure 9C:
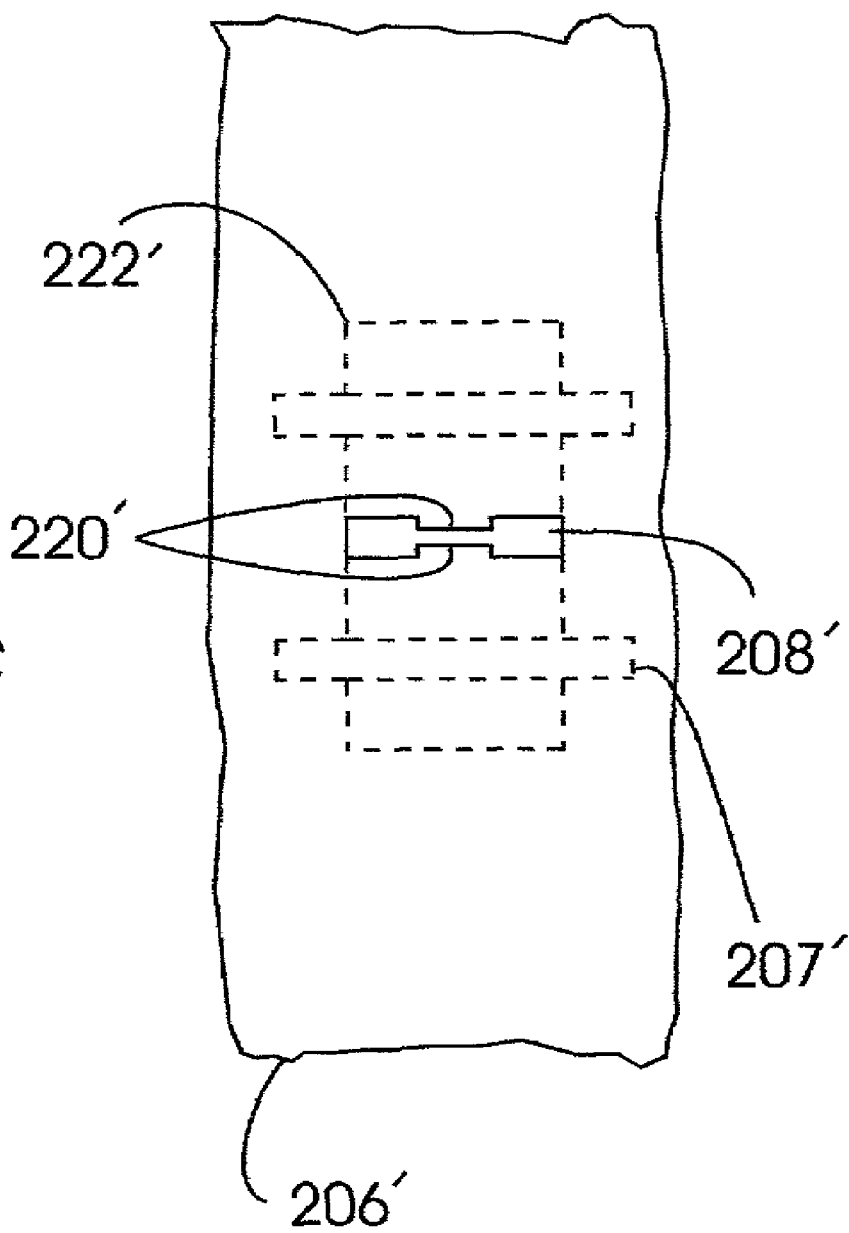
FIG. 9C is an ABS view of an optical device that includes an optical resonance member whose elements are oriented at 90 degrees with respect those of the embodiment of FIGS. 9A and 9B.

FIG. 9C is an ABS view of an alternative embodiment that includes a metallic layer 206' having a single ridge 207' therein on each side of a slit 208' (that passes through the metallic layer and includes notches 220'), as well as dielectric material separating the metallic layer from a waveguide/cladding (with the boundary between the waveguide and cladding indicated by the numeral 222'). In short, all these elements have been rotated 90 degrees with respect to their counterparts in FIG. 9B, so that they have the same orientation as the rest of the read/write structure in FIG. 6 (e.g., the first and second pole piece layers 92 and 94). In this case, the entire fabrication process may be carried out at the wafer level. Further, when only one surface plasmon inducing feature, such as a ridge or a trench, is used on each side of an emission region (as in FIG. 9C), the ridge or trench may be advantageously replaced with a step edge (a step transition in the thickness of the metallic layer).

The waveguide 203 in the various embodiments herein couples light (as used herein, this term includes electromagnetic radiation outside the visible portion of the spectrum) to the optical resonance element 102. The polarization of this light is advantageously perpendicular to the orientation of the ridges 207, so that surface plasmons are set up within the metallic layer 206 as a result of the light's interaction with the array or lattice of features in the metallic layer 206 (in which those features may be ridges or trenches, for example). These surface plasmons in turn produce near-field electromagnetic radiation that radiates away from the slit 208 and is thus available to heat the magnetic disk 34. A regular array of features allows the coupling of incident light to surface plasmons, since the features acts as a resonant structure. The increased surface charge motion around the features leads to an increase in the re-radiation of light on the opposing surface and a very large transmission factor. The effect is largest when metals with low optical absorption are used, such as gold, silver, copper, and aluminum. Accordingly, the slit 208 acts as an emission region; during writing, its distance over the disk 34 is preferably kept within a wavelength of light (more preferably to within 50 nanometers), so that an intense near-field optical field is directed onto the recording medium. As discussed in more detail below, the near-field light intensity emanating from the slit 208 is considerably enhanced over the transmission intensity one would expect in the absence of the surface plasmon inducing features. Also, the presence of the notches 220 in the slit 208 may act to further increase the intensity of the light emanating from the slit.

The regular arrays or lattices of features used herein to generate the surface plasmons do not necessarily need to be on a particular side of the optical resonance element, and may be surrounded by one or more non-conducting materials. The features in the array act in concert to create the boundary conditions necessary to form scattering sites, so that a resonant structure is formed for a surface electromagnetic resonance (such as a surface plasmon) on the metal structure (e.g., the metallic layer 206). The individual features themselves may have any one of a number of shapes (e.g., circular, square, rectangular, elliptical, or linear), and the lattice may have any one of a number possible patterns (e.g., square, triangular, linear array of lines). The lattice may be formed by any one of a number of nanolithography techniques, including e-beam, focused ion-beam, interferometric lithography, EUV lithography, stamping, and self assembly processes.

The frequency of the incident light is advantageously matched to the frequency of the surface resonance, with the dimensions of the metal structure and lattice constant chosen so that the resonance is tuned to the input optical frequency of the light propagating through the waveguide (or alternatively, with the optical frequency being tuned to match the dimensions of the metal structure and the lattice constant). The resonant mode is advantageously predominantly confined to a particular region or side of the metal structure, and may emanate from a slit or a member that protrudes from the metal structure.

The slit shown in FIG. 9B is substantially longer than it is wide. This geometry results in an enhancement of the optical intensity greater than that from an aperture that is, for example, circular (as discussed in more detail below). Additionally, the geometry of the slit 208 is well suited for the application of magnetic recording, since the width of the slit effectively defines the tracks in the magnetic disk 34. (Note that in the embodiment of FIG. 9C, the notches 220' help to confine the emitted optical radiation to a track that is narrower than would be obtained in the absence of notches.) The near-field radiation emanating from the slit 208 is used to heat a track within the disk 34, followed by the writing of bits into that track. An aperture having a shape other than a slit may be used as an emission region, e.g., the shape of the aperture may be chosen to create a desired near-field optical pattern or size. Further, the size and depth of the aperture may be selected to be at a particular resonance. As discussed below, the emission region is not necessarily an aperture, but it may be near an aperture, or it may plug or partially plug an aperture. A protrusion such as a sharp corner or tip on a resonant structure may be used, e.g., the shape of the protrusion may be square, rectangular, conical, or the protrusion may include an edge designed to produce the desired shape for the optical region. Also, the emission region may be offset relative to a feature in the lattice to control the phase of the surface resonance at the emission region.

In general, if the emission region is a slit, it may be either parallel or perpendicular to the data track direction. One advantage of a parallel orientation is very narrow track width (suitable for recording at areal densities of 1 Tb/in$^2$ and higher), while a perpendicular orientation may result in less curvature to the bit shape. In either case, the optical output emanating from the emission region is used to heat up a portion of the recording media, which when used in combination with a magnetic field orients the magnetic bit.

The in-track bit density may be determined, in part, by the field gradient produced by the magnetic pole pieces. In thermally-assisted magnetic recording, it is not necessary in general to have a large field gradient, since a large thermal gradient exists at the trailing edge of the heated area. This thermal gradient is equivalent to a large field gradient since a magnetic recording medium has a temperature dependent coercivity. Thus, it is sufficient that the pole pieces just provide a large field that can be switched at high frequency for field-modulated writing of bits at the heated region of the trailing edge. Field modulated writing allows the heated region to be elongated along the track direction (from an elongated aperture or slit) and still have a high bit density along the track. Because a large field gradient is not needed, the pole pieces may be larger and may be located further away from the heated region, while still providing a sufficiently large field amplitude.

Figure 10:
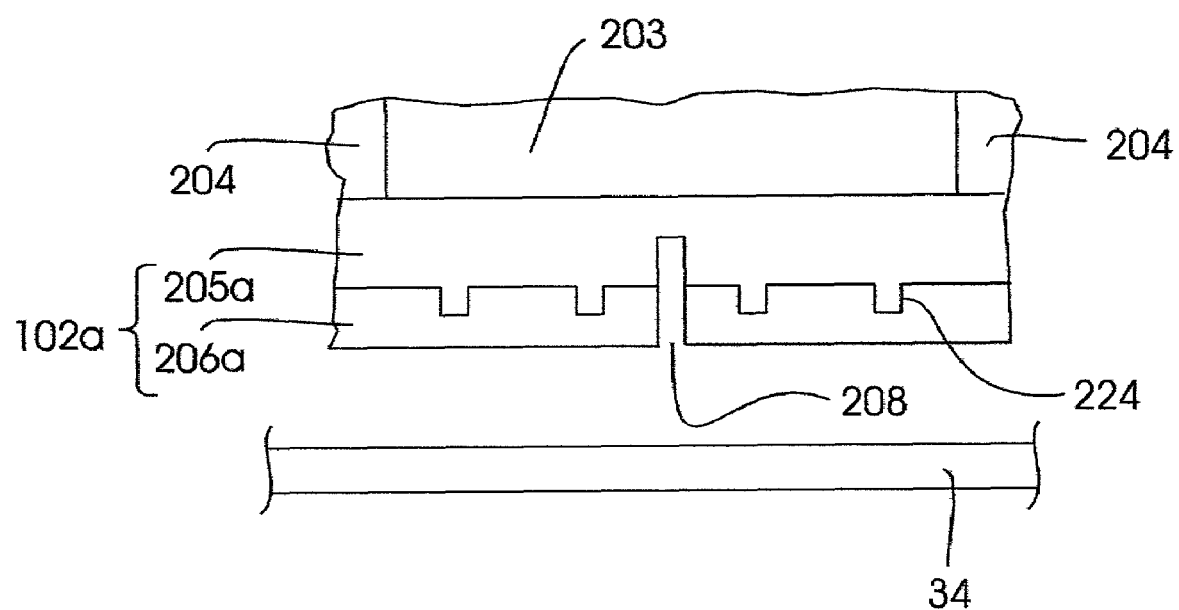
FIG. 10 shows a partial cross sectional end view (of the same orientation as FIG. 6A) of an optical device that includes an optical resonance member having a periodic array of trenches in a metallic layer and a slit through which optical radiation is emitted.

FIG. 10 shows an alternative optical resonance element 102a that includes dielectric material 205a and a metallic layer 206a. The metallic layer 206a includes a periodic array of trenches 224 (as opposed to the periodic array of ridges 207 of FIGS. 9A and 9B), but this embodiment is otherwise designed like and functions similarly to its counterpart of FIGS. 9A and 9B. (Alternatively, trenches could be built into the waveguide 203, without using the dielectric material 205a.) Optical radiation incident on the resonance element 102a is directed through the slit 208 onto the disk 34, with a substantial fraction of the near-field (i.e., less than one optical wavelength) intensity arising from surface plasmons generated in the metallic layer 206a.

Figure 11A:
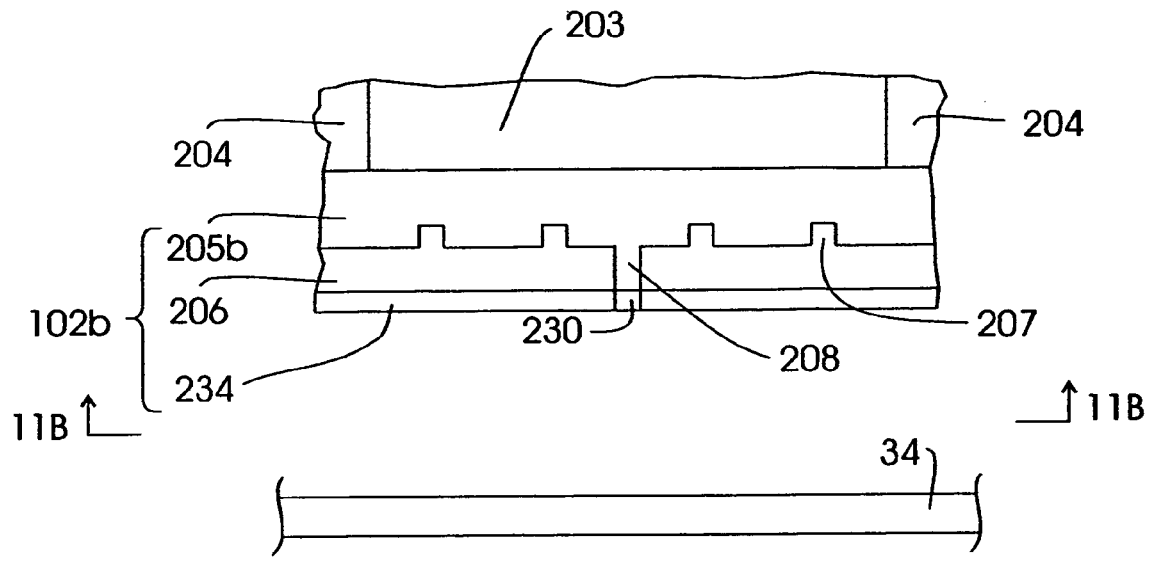
FIGS. 11A and 11B show a partial cross sectional end view and an ABS view, respectively, of an optical device that includes an optical resonance member having a periodic array of ridges in a metallic layer and a protrusion member from which optical radiation is emitted.
Figure 11B:
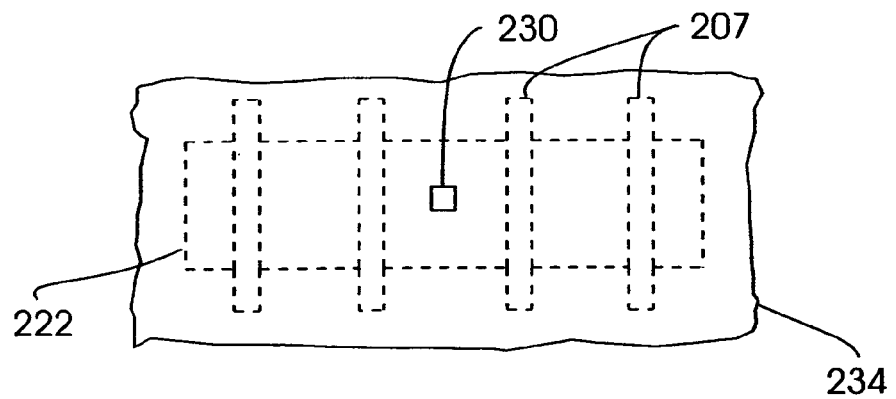

FIGS. 11A and 11B show yet another optical resonance element 102b that is similar to the resonance element 102 of FIGS. 9A and 9B, except for the presence of a metallic protrusion member 230. The embodiment of FIGS. 11A and 11B, as well as other embodiments herein, may include a protective overcoat layer 234 (e.g., carbon, carbon nitride, silicon nitride, or dielectric material). In addition, dielectric material 205b now occupies the space that previously defined the slit 208. In this embodiment, the protrusion member 230 acts as an optical emission member that radiates electromagnetic radiation onto the disk 34.

Figure 12A:
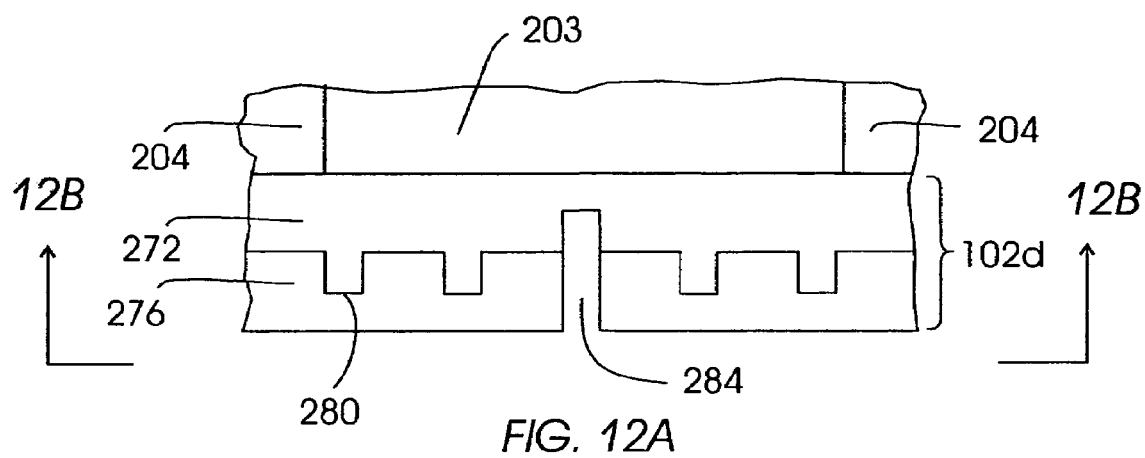
FIGS. 12A and 12B show a partial cross sectional end view (of the same orientation as FIG. 6A) and an ABS view, respectively, of an optical device that includes a two dimensional array of trenches disposed about a slit.
Figure 12B:
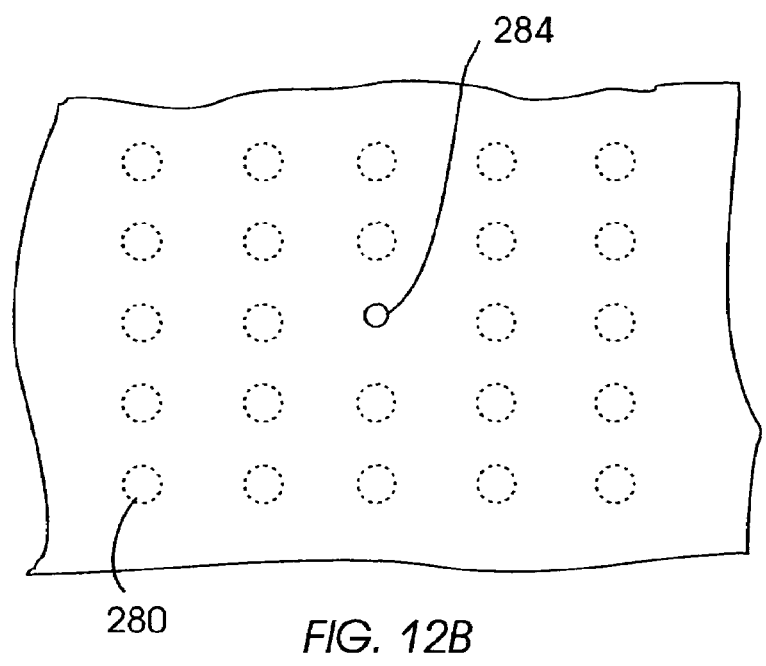

A two-dimensional array of features (dimples) is illustrated in the optical resonance element 102d of FIGS. 12A and 12B. Dielectric material 272 joins the waveguide 203/cladding 204 to a metallic layer 276 that has an array of trenches 280 therein. A hole 284 in the metallic layer 276 acts as an emission region of electromagnetic radiation that is directed onto the magnetic disk 34 (which is not shown in FIGS. 12A and 12B).

Figure 13:
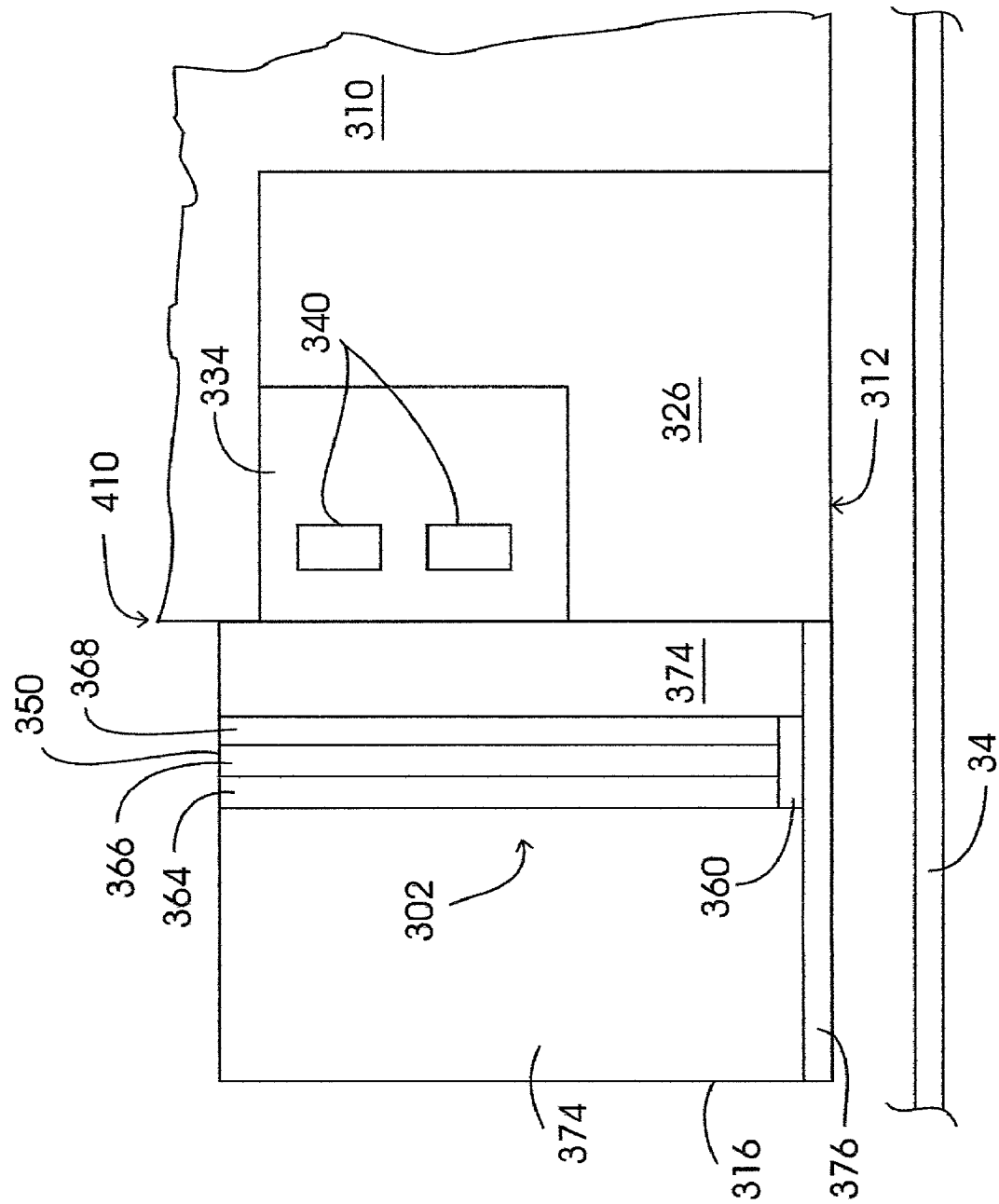
FIG. 13 is cross sectional view of an embodiment in which a light source is integrated with a slider.

FIG. 13 shows a schematic cross section of an alternative embodiment, in which a light source such as a laser diode 302 is integrated with a slider 310 having an air bearing surface 312, with the laser diode 302 being near a trailing edge 316 of the device. The laser diode 302 is located near or adjacent to both a first pole piece 326 and an insulating member 334 that surrounds coils 340 for generating a magnetic field. The laser diode 302 includes a first reflector, such as a facet 350, and a second reflector 360 at the output side of the laser diode; it further preferably includes an n-type layer 364, an active layer 366 (from which photons are emitted), and a p-type layer 368. In addition, the laser diode 302 may be advantageously secured to a substrate 374 for ease of handling. (Alternatively, the laser diode 302 may be fabricated on the same wafer as the read/write head.) Current is supplied to the laser diode 302 with electrical leads (not shown) connected to the n-type and p-type layers 364 and 368, respectively. The laser diode 302 and the mounting element 374 are preferably covered with an overcoat layer 376 made of carbon, for example. A second pole piece (not shown) may be included to enhance or tailor the write field.

Figure 14A:
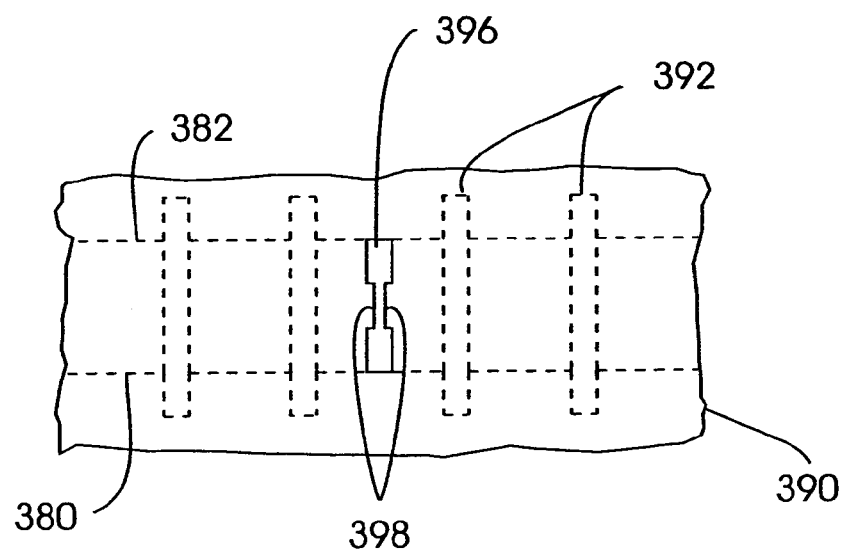
FIGS. 14A and 14B are air bearing surface and partial cross sectional views, respectively, of the optical device of FIG. 13.
Figure 14B:
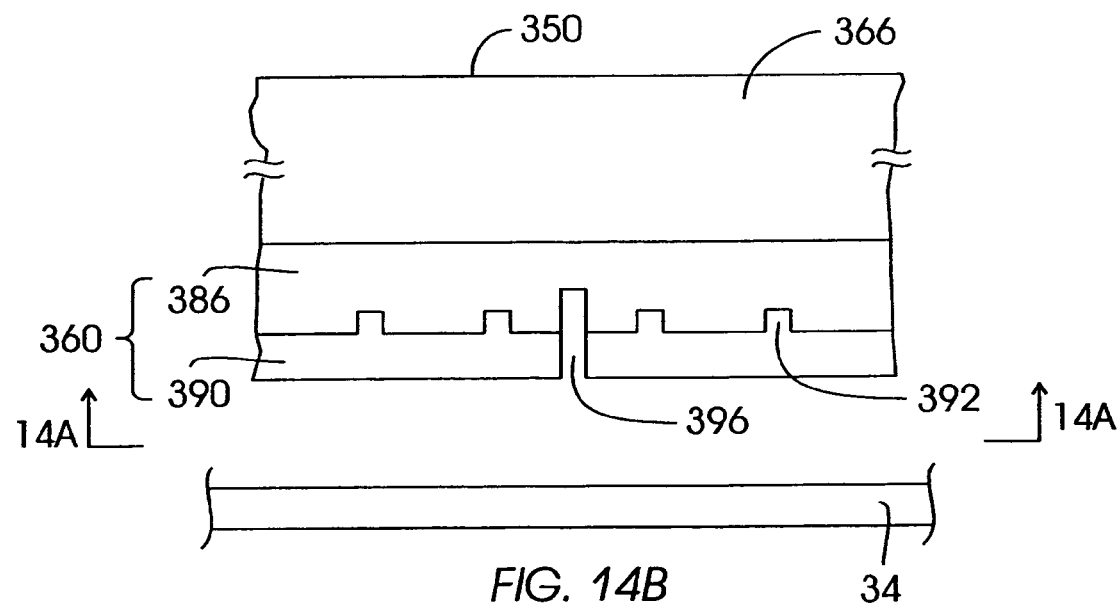

FIGS. 14A and 14B are more detailed views of the laser diode 302 of FIG. 13, with FIG. 14A showing an ABS view of the laser diode 302. FIG. 14A shows (in dashed lines) an interface 380 between the n-type layer 364 and the active layer 366, as well as an interface 382 between the p-type layer 368 and the active layer 366. The second, or output, reflector 360 here includes dielectric material 386 and a metallic layer 390 that includes ridges 392 therein. A slit 396 (that may advantageously include notches 398 therein) in the output reflector emits optical radiation from laser diode 302 onto the magnetic disk 34. Thus, the second reflector 360 functions like the optical resonance elements described herein, with surface plasmons in the metallic layer 390 acting to enhance the transmission of optical radiation through the slit 396 beyond that which would pass through the slit in the absence of the ridges 392. The array of features in the second reflector 360 may include features other than the ridges 392, e.g., trenches may be used. As in other embodiments disclosed herein, during the writing process the emission region (slit) 396 is preferably kept to within a wavelength of light of the magnetic disk 34, more preferably to within 75 nanometers, and still more preferably to within 50 nanometers, so that an intense near-field optical field is directed onto the recording medium 34.

One advantage of integrating the laser diode 302 and the slider 42 in this fashion is that optical radiation that is not absorbed by surface plasmon excitation may remain in the cavity of the diode laser 302, thereby increasing the efficiency of the laser diode. Another advantage is that the wavefront of the optical radiation emitted from the slit 396 is planar and has the proper polarization.

The device of FIGS. 13 and 14A, B may be assembled by constructing the slider 310/pole piece 326/insulating member 334/coils 340 portion of the device in one step, and separately constructing the laser diode 302/mounting element 374/overcoat layer 376 portion of the device in another step. These portions of the device may then be integrated along their common interface 410 by placing them both on an optical flat and bonding them together with conductive epoxy or conductive solder; using a conductive bonding element permits electrical connections to be made. At this point, gentle lapping of the assembled device may be necessary so that the air bearing surface 312 and the overcoat layer 376 form a smooth, continuous surface. The slit 396 may then be formed in the second reflector 360 through the use of a focused ion beam or e-beam lithography. Techniques for assembling such components are discussed in U.S. Pat. No. 5,625,617 to Hopkins et al., which is hereby incorporated by reference.

EXPERIMENTAL

In the experimental results that follow, the transmission of optical radiation through metallic films on quartz substrates is explored. The metallic films function like the metallic layers in the optical resonance elements described herein.

Figure 15A:
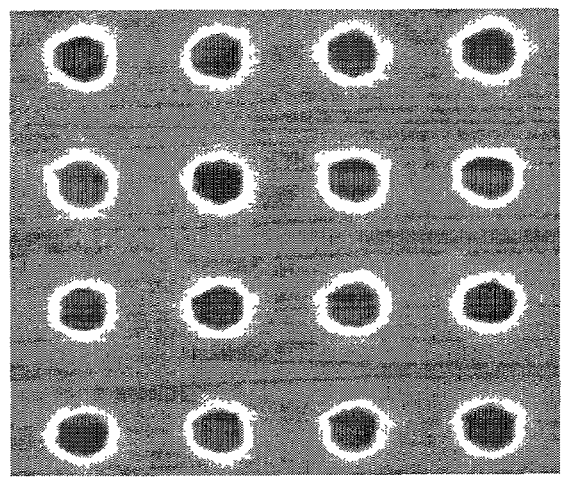
FIG. 15A is a scanning electron micrograph image of an array of holes in a silver film deposited on quartz.
Figure 15B:
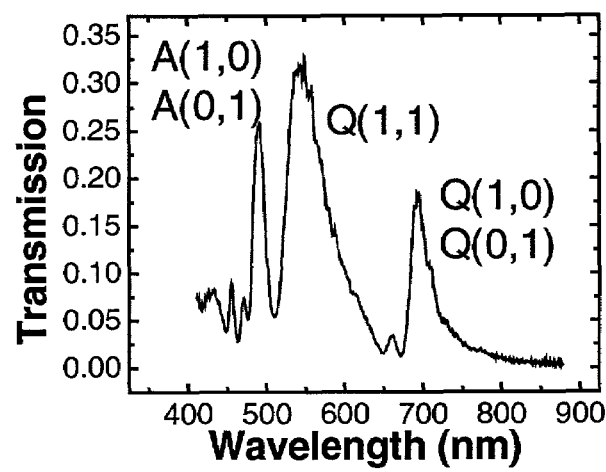
FIG. 15B shows the transmission spectrum of diffracted light (zero-order) through a structure similar to the one shown in FIG. 15A.
Figure 15C:
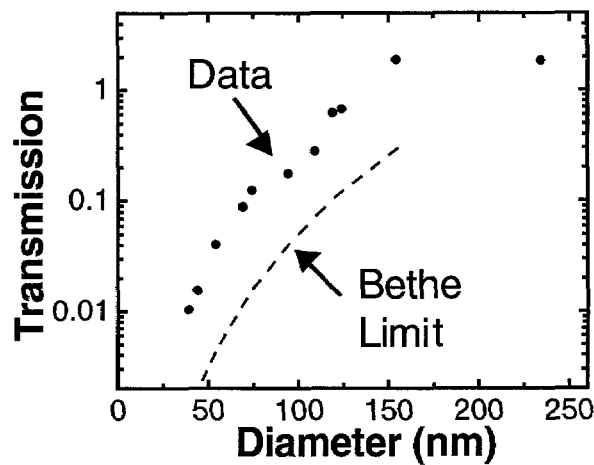
FIG. 15C shows experimental and theoretical transmission (as a function of hole diameter) for structures similar to the one shown in FIG. 15A.

FIGS. 15A and 15B illustrate surface plasmon enhanced transmission through a square array of holes. FIG. 15A shows a scanning electron micrograph image of an array of holes in a 150 nanometer thick silver film deposited on quartz (a quartz substrate was used for all the structures in FIGS. 15–18). The diameter of the holes is 155 nanometers, and the distance between the holes is 450 nanometers. These holes were formed by focused ion beam milling. FIG. 15B shows a transmission spectrum of the diffracted light (zero-order) for an array like the one shown in FIG. 15A, except that the holes have a diameter of 110 nanometers. For the data of FIG. 15B (as well as for the other transmission spectra herein), a collimated white light source was used for illumination at normal incidence while transmitted light was collected with a microscope objective, a spectrophotometer, and a liquid nitrogen cooled CCD array. In FIG. 15B, transmission is normalized to the fraction of the total area occupied by the holes. For a square array of holes, surface plasmon resonances occur at wavelengths given by $a_0(i^2+j^2)^{-1/2}(e_1 e_2/e_1+e_2)^{1/2}$, in which $a_0$ is the distance between hole, i and j are integers, and $e_1$ and $e_2$ are the real components of the dielectric function of the two materials at the interface. Surface plasmon resonances occur at the air-metal, A(i, j), and quartz-metal, Q(i, j), interfaces. The three lowest frequency modes, designated A(1,0), Q(1,1), and Q(1,0), are indicated. FIG. 15C shows transmission data (normalized to the fraction of the total area occupied by the holes) as a function of hole diameter for the Q(1,1) mode. Transmission above one indicates that more light was transmitted though the holes than was incident directly on the area occupied by the holes. Also shown is the theoretical maximum Bethe transmission for an infinitely thin, perfectly conducting metal screen with a single hole (see Durig et. al., J. Appl. Phys. 59, 3318, 1986). The relatively small transmission for such small holes relative to holes larger than 150 nanometers (see Ebbesen et. al., Nature 391, 667, 1998), suggests that a 2-dimensional array of holes may not be optimum for generating intense near-field radiation for ultra-high density data recording purposes, particularly for hole sizes below about 150 nanometers (even though the transmission is about 10 times larger than the maximum predicted by theory in the case of no surface plasmon enhanced transmission).

Figure 16A:
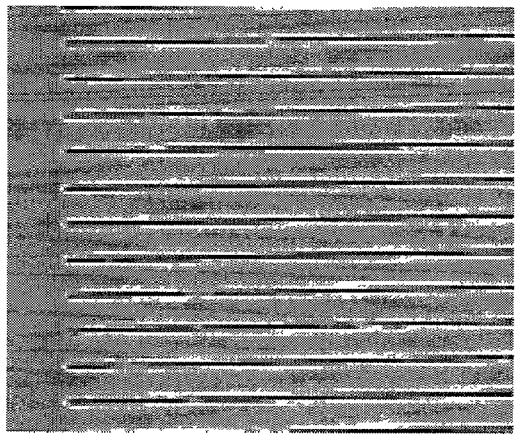
FIG. 16A shows a scanning electron micrograph image of a grating made in silver (on quartz) in which the spacing between adjacent slits is equal to 450 nanometers.
Figure 16B:
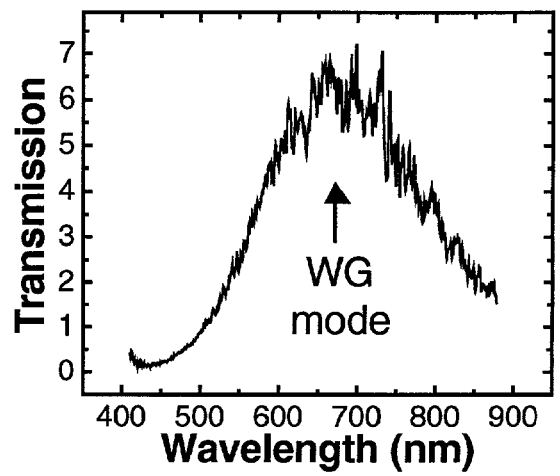
FIGS. 16B, 16C, and 16D show transmission spectra through silver gratings similar to the one shown in FIG. 16A, in which the slit spacing is 225 nanometers, 330 nanometers, and 450 nanometers, respectively, and in which surface plasmon (SP) and waveguide (WG) resonances are indicated.
Figure 16C:
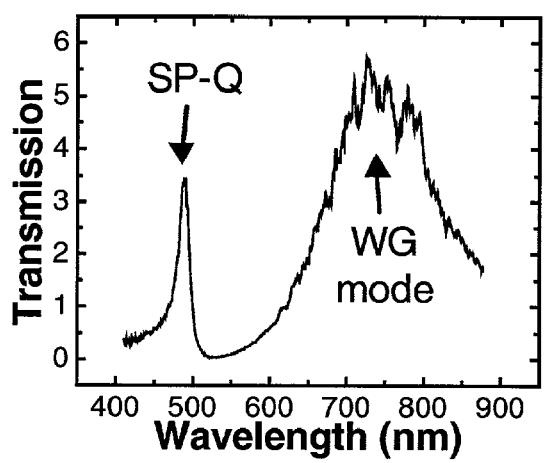
Figure 16D:
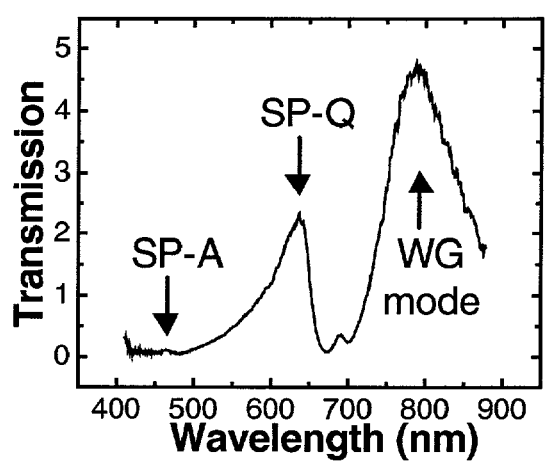

Transmission can be increased substantially using geometries other than an array of holes. FIG. 16A shows a scanning electron micrograph image of a metallic grating (225 thick silver on quartz) having a slit width of 50 nanometers and a slit spacing equal to 450 nanometers. FIGS. 16B, 16C, and 16D show zero-order transmission spectra for slit spacings of 225 nanometers, 330 nanometers, and 450 nanometers, respectively. For FIGS. 16B, 16C, and 16D, transmission is normalized to the fraction of the total area occupied by the slits. Transmission above one indicates that more light was transmitted though the holes than was incident directly on the area occupied by the holes. For these data (as well as those of FIGS. 17 and 18), the incident collimated white light used to determine transmission was polarized perpendicular to the slits with normal incidence. FIG. 16B shows experimental data for a waveguide transmission resonance (labeled WG in the Figures). The surface plasmon (SP) mode peak position as a function of wavelength depends linearly on the spacing between the slits according to $\lambda=a_0[\epsilon_1\epsilon_2/(\epsilon_1+\epsilon_2)]^{1/2}$, in which $a_0$ is the distance between slits. The SP mode at the air interface (SP-A) is weak relative to the SP mode at the quartz interface (SP-Q).

Figure 17:
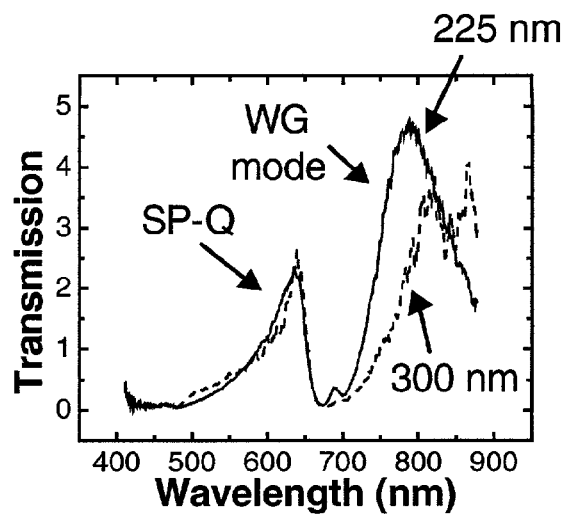
FIG. 17 shows additional transmission data through a silver (on quartz) grating (slit separation of 450 nanometers) for film thicknesses of 225 nanometers and 300 nanometers.

FIG. 17 shows transmission resonance data through metallic gratings (laid out like the grating shown in FIG. 16A), having a slit width of 50 nanometers, a slit spacing of 450 nanometers, and a film thicknesses of 225 and 300 nanometers. These data suggest that when using a diode laser emitting at 630 nanometers as the optical source for thermally assisted recording, an appropriate choice of metallic layer is one having a separation between the slits of about 450 nanometers. Other data suggest that surface plasmon enhanced transmission is increased substantially when using a high conductivity metal (such as Au, Ag, Al, and Cu) as opposed to a low conductivity metal (such as tungsten).

Figure 18A:
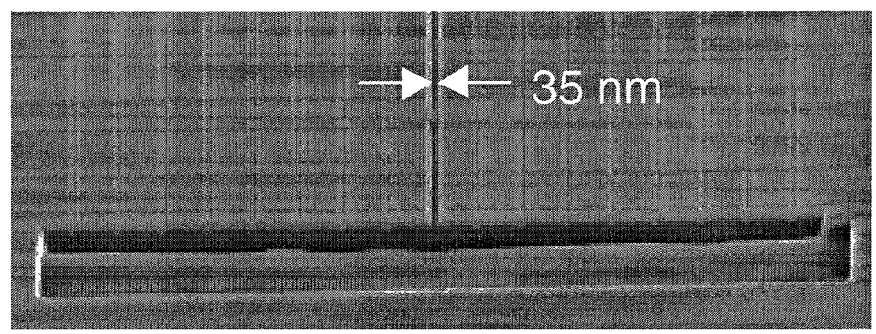
FIG. 18A is a scanning electron micrograph image of a silver (on quartz) film structure having a single slit (of width 35 nanometers) between 120 nanometer high ridges (in the metal film) separated by 450 nanometers.
Figure 18B:
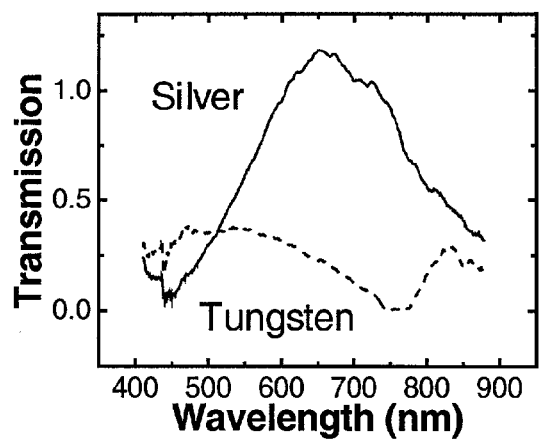
FIG. 18B shows transmission spectra for structures consisting of a single, isolated slit in 225 nanometer thick silver and tungsten films (on quartz), respectively.
Figure 18C:
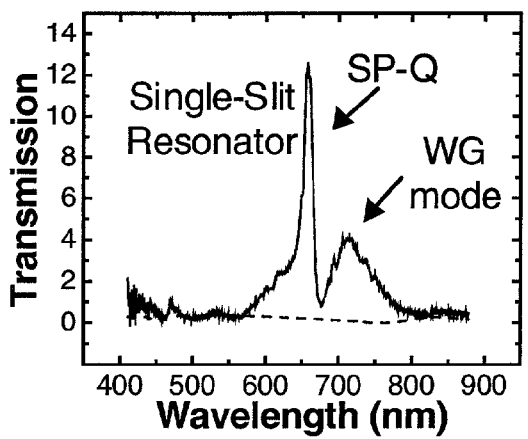
FIG. 18C shows a transmission spectrum for the structure shown in FIG. 18A.

As suggested by the data above, a surface plasmon resonance (or a waveguide resonance) may be generated not just with a regular array of holes or slits, but also with an array in which all but one (or more) of the holes or slits in such a regular array is replaced with raised or lowered regions in the surface of the metal film, so that the metal film includes ridges or trenches (such as in the embodiments discussed herein). FIG. 18A shows a scanning electron micrograph image of a metallic (silver) film on quartz, in which the metallic film has a single 35 nanometer wide slit (in the center of the Figure) surrounded by an array of ridges. The array of ridges was formed by patterning 120 nanometer deep trenches in the quartz substrate before silver was evaporated onto it. This kind of structure has substantially greater transmission than one having a single slit without any surrounding ridges. FIG. 18B shows normalized transmission spectra for isolated single slits in 225 nanometer thick silver film (and tungsten film). FIG. 18C presents the normalized transmission spectrum for the silver film of FIG. 18A, showing the waveguide (WG) resonance and surface plasmon (SP) resonance at the quartz interface. The transmission of an isolated slit in a film of tungsten is shown for comparison (dotted line).

As suggested by FIG. 18C, the silver film of FIG. 18A is tailored for transmission at 650 nanometers. Thus, a laser diode at this wavelength and a silver film having a lattice constant of about 450 nanometers effectively transmit 650 nanometers optical radiation. The transmission of this device is about 60 times larger at 650 nanometers (plasmon mode) than for the isolated slit in the film of tungsten at the same wavelength and 15 times larger at 715 nanometers (at the waveguide resonance) than for the isolated slit in the film of tungsten. As suggested by the fact that the normalized transmission is above one, this silver film device collects optical power over a region much larger than the slit itself and transmits the power effectively through a sub-wavelength opening. Note that the maximum transmission for this 35 nanometers slit structure (in which the transmission is approximately 10, see FIG. 18C) is approximately 1000 times larger than for the 2-dimensional array of 40 nanometers diameter holes (for which the transmission is approximately 0.1, see FIG. 15C), indicating that an emission region in the form of a slit may be advantageously used for ultrahigh density data recording.

Although the recording of information has been described herein principally with respect to magnetic recording on magnetic disk, embodiments of the invention may be used in conjunction with other kinds of recording media, such as magneto-optic, phase-change, or chemical-change, and may be caused or assisted by heating or photo-chemistry. The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

What is claimed is:

1. An apparatus for facilitating the recording of data, comprising:
   an optical source;
   a metallic structure that receives optical radiation from the optical source and emits optical output from an emission region in said structure, said structure having an array of features that couple the radiation to at least one surface plasmon mode of said structure to increase the emitted optical output from said emission region beyond what the emitted optical output from said emission region would be in the absence of said features, wherein the emitted optical output includes a near-field portion tat extends from said emission region out to a distance less than the average wavelength of the emitted optical output; and
   at least one element secured to said metallic structure, said at least one element generating magnetic fields whose strength is sufficient to write data in a data recording medium located within the near-field portion.

2. The apparatus of claim 1, further comprising a platform to which said structure and said at least one element are secured, wherein said platform is configured to be moved relative to a data recording medium while the separation between said emission region and a surface of the data recording medium is kept to less than said average wavelength.

3. The apparatus of claim 2, wherein said separation is no greater than said near-field distance.

4. The apparatus of claim 2, wherein said platform is a slider having an air-bearing surface.

5. The apparatus of claim 1, said optical source comprising a laser.

6. The apparatus of claim 5, wherein said emission region is located at an output face of said laser.

7. The apparatus of claim 1, said optical source comprising an optical waveguide coupled to a source of optical radiation.

8. The apparatus of claim 1, wherein said metallic structure includes metal selected from the group consisting of Au, Ag, Cu, Al, and Cr.

9. The apparatus of claim 1, wherein said emission region includes dielectric material.

10. The apparatus of claim 1, wherein the spacing between said features in said metallic structure is chosen to enhance the optical output from said emission region at at least one predetermined wavelength, and wherein the emitted optical output is intense enough to heat a magnetic recording medium sufficiently to facilitate the recording of data.

11. The apparatus of claim 1, wherein said array includes recessed areas within said metallic structure.

12. The apparatus of claim 1, wherein the spacing between said features in said metallic structure is periodic.

13. The apparatus of claim 1, wherein said metallic structure is joined to at least one dielectric layer.

14. The apparatus of claim 1, wherein said emission region includes an aperture.

15. The apparatus of claim 14, wherein said aperture is a slit.

16. The apparatus of claim 14, wherein said aperture has a width at its narrowest point of about 10–100 nanometers.

17. The apparatus of claim 1, wherein said emission region includes a protrusion member.

18. The apparatus of claim 1, said at least one element comprising at least one poling piece for applying a magnetic field in a portion of a storage medium as the emitted optical output from said emission region heats the portion.

19. The apparatus of claim 1, wherein the thickness of said structure is 50–500 nanometers.

20. The apparatus of claim 1, wherein the optical radiation from said source has a full width half maximum (FWHM) of less than about 0.1 times the average wavelength of the optical radiation.

21. The apparatus of claim 1, wherein the optical radiation has a frequency that matches a resonant frequency of said structure.

22. The apparatus of claim 1, wherein said structure includes two features.

23. The apparatus of claim 1, wherein the optical radiation from the optical source is directed onto a first surface of the structure that faces the optical radiation, thereby setting up surface charge motion around the features which leads to optical radiation emanating from a surface of the structure opposite the first surface.

24. The apparatus of claim 1, wherein the emission region in said structure includes an optical aperture that emits optical output, and wherein the optical radiation received by said structure is polarized perpendicularly to an axis along which a longer dimension of the optical aperture is oriented.

25. A method at directing electromagnetic radiation onto a data recording medium, comprising:
   providing a metal structure having an array of features;
   directing optical radiation onto the array of features to generate at least one surface plasmon mode, thereby enhancing the optical output emanating from an emission region in the metal structure beyond what the optical output from the emission region would be in the absence of the features, wherein the spacing between the features is chosen to enhance, at a predetermined wavelength, the optical output emanating from the emission region; and
   directing the optical output from the emission region onto a recording medium to facilitate the recording of data.

26. The method of claim 25, further comprising applying a magnetic field to the recording medium to write data into the recording medium.

27. The method of claim 26, comprising heating the recording medium with the optical output to facilitate the recording of data.

28. The method of claim 27, wherein the recording medium is granular and has a grain size of between 10 and 250 cubic nanometers.

29. The method of claim 25, wherein the recording medium includes a medium selected from the group consisting of magneto-optic, phase-change, and chemical change media.

30. The method of claim 25, wherein the optical radiation is directed onto a first surface of the array of features, thereby setting up surface charge motion around the features which leads to optical radiation emanating from a surface opposite the first surface, wherein the optical output from the emission region includes the optical radiation emanating from said opposite surface.

31. The method of claim 25, wherein the emission region includes an optical aperture from which optical output is emitted, end wherein the optical radiation is polarized perpendicularly to an axis along which a longer dimension of the optical aperture is oriented.

32. The method of claim 31, wherein the optical aperture includes a slit.

33. A method of directing electromagnetic radiation onto a recording medium comprising:
providing a metal structure having an array of features;
directing optical radiation onto the array of features to generate at least one surface plasmon mode, said at least one surface plasmon mode enhancing the effective transmission of the optical radiation through the metal structure beyond what the effective transmission would be in the absence of the features, wherein the transmission of the optical radiation through the metal structure is resonantly enhanced at a predetermined wavelength;
directing optical output emanating from the metal structure onto a recording medium to heat the recording medium, thereby facilitating the recording of data; and
reading back the data with a processor.

34. An apparatus for facilitating the recording of data, comprising:
an optical source;
a structure that receives optical radiation from said source and emits optical output from an emission region in said structure, said structure having an array of metallic features that couple the radiation from one side of said structure to another side of said structure through surface plasmons generated in said structure by the optical radiation, wherein the emitted optical output includes a near-field portion that extends from said emission region out to a distance less than the average wavelength of the emitted optical output;
at least one element secured to said structure, said at least one element generating magnetic fields for writing data in a data recording medium located within the near-field portion; and
a platform to which said stricture is secured, wherein said platform is configured to be moved relative to a data recording medium while the separation between said emission region and a surface of the data recording medium is kept to less than said average wavelength.

35. A method of directing optical radiation onto a recording medium, comprising:
providing a structure having an emission region and an array of metallic features that couple optical radiation into surface plasmons in the structure;
directing optical radiation onto the array of features;
directing optical output from the emission region that is generated by surface plasmons onto a recording medium to heat the medium and thereby facilitate the recording of data, wherein the recording medium is granular and has a grain size of between 10 and 250 cubic nanometers; and
reading the recorded data with a processor.

36. A method of writing data, comprising:
generating surface plasmons in a structure, in order to direct optical radiation produced by the surface plasmons onto a magnetic medium to heat a portion of the medium and thereby facilitate the recording of data; and
applying a magnetic field to the recording medium to write data into the recording medium, wherein the recording medium has a grain size of between 10 and 500 cubic nanometers.

37. A method of directing electromagnetic radiation onto a data recording medium, comprising:
providing a metal structure having en array of features;
directing optical radiation onto the array of features to generate at least one surface plasmon mode, thereby enhancing the optical output emanating from an emission region in the metal structure beyond what the optical output from the emission region would be in the absence of the features; and
directing the optical output from the emission region onto a recording medium to facilitate the recording of data, wherein the recording medium is granular and has a grain size of between 10 and 250 cubic nanometers.

38. The method of claim 37, further comprising applying a magnetic field to the recording medium to write data into the recording medium.

39. The method of claim 38, comprising heating the recording medium with the optical output to facilitate the recording of data.

40. The method of claim 37, wherein the recording medium includes a medium selected from the group consisting of magneto-optic, phase-change, and chemical change media.

41. A method, comprising:
directing input optical radiation onto metallic features of a structure, wherein the features have a spatial configuration selected to increase optical transmission from an emission region in the structure beyond what the optical transmission from the emission region would be in the absence of the features; and
directing output optical radiation emanating from the emission region onto a recording medium, in order to heat the recording medium and thereby assist in the recording of data in the recording medium, wherein the optical transmission from the emission region is higher as a result of at least one surface plasmon mode generated by said directing of input optical radiation onto the features.

42. The method of claim 41, wherein the recording medium has a magnetic grain size of between 10 and 500 cubic nanometers.

43. The method of claim 41, wherein the recording medium has a magnetic grain size of between 10 and 250 cubic nanometers.

44. The method of claim 41, further comprising reading back data recorded in the medium.

45. The method of claim 41, wherein the spatial configuration includes a periodic array.

46. The method of claim 41, wherein the input optical radiation is directed onto a first surface of the features that faces the input optical radiation, thereby setting up surface charge motion around the features which leads to optical radiation emanating from a surface opposite the first surface, wherein the output optical radiation includes the optical radiation emanating from said opposite surface.

47. A method, comprising:
generating surface plasmons in a structure, in order to direct optical radiation produced by the surface plasmons onto a magnetic medium and thus heat a portion of the medium, thereby facilitating the recording of data; and
applying a magnetic field to the recording medium to write data into the recording medium.

48. A method, comprising:
generating surface plasmons in a structure so that optical radiation resulting from the surface plasmons is directed onto a magnetic medium and thus heats a portion of the medium, thereby facilitating the recording of data; and
applying a magnetic field to the recording medium to write data into the recording medium.

49. The method of claim 48, wherein the structure has an air-bearing surface, the surface being separated from and feting the magnetic medium.

50. The method of claim 48, wherein the surface plasmons are generated by optical radiation that is incident on the structure, and wherein the structure includes an optical aperture that emits optical radiation, with the incident optical radiation being polarized perpendicularly to an axis along which a longer dimension of the optical aperture is oriented.

* * * * *

UNITED STATES PATENT AND TRADEMARK OFFICE
CERTIFICATE OF CORRECTION

PATENT NO. : 6,982,844 B2
DATED : January 3, 2006
INVENTOR(S) : Charles T. Rettner and Barry C. Stipe It is certified that error appears in the above-identified patent and that said Letters Patent is hereby corrected as shown below:

Column 2,
Lines 9-10, replace "a magnetic grain" with -- an optical spot --.

Column 5,
Line 19, replace "separation" with -- spacing --.

Column 9,
Line 36, replace "region of the" with -- region's --.
Line 53, after "208" insert -- and --.

Column 10,
Lines 64 and 67, replace "step" with -- set of steps --.

Column 12,
Lines 6 and 7, replace "holes" with -- slits --.
Line 22, delete "a".

Column 13,
Lines 1 and 3-4, replace "nanometers" with -- nanometer --.
Line 5, replace "0.1" with -- 0.01 --.
Line 10, before "magnetic" insert -- a --.
Line 35, replace "tat" with -- that --.

Column 15,
Line 14, replace "end" with -- and --.

Column 16,
Line 17, replace "en" with -- an --.

Column 18,
Line 5, replace "feting" with -- facing --.

Column 3,
Line 2, add the following paragraph:
    -- One embodiment of the invention is an apparatus for facilitating the recording of data. The apparatus includes an optical source and a metallic structure that receives optical radiation from the optical source. The metallic structure includes an emission region from which optical output is emitted, as well as an array of features that couple the radiation to at least one surface plasmon mode of the structure to increase the emitted optical output from the emission region beyond what the emitted optical output from the emission region would be in the absence

UNITED STATES PATENT AND TRADEMARK OFFICE
CERTIFICATE OF CORRECTION

PATENT NO. : 6,982,844 B2
DATED : January 3, 2006
INVENTOR(S) : Charles T. Rettner and Barry C. Stipe It is certified that error appears in the above-identified patent and that said Letters Patent is hereby corrected as shown below:

Column 3 (cont'd),
of the features. The emitted optical output includes a near-field portion that extends from the emission region out to a distance less than the average wavelength of the emitted optical output (e.g., the intensity weighted average wavelength). The apparatus further includes at least one element secured to the metallic structure, with this element generating magnetic fields for writing data in a data recording medium located within the near-field portion. A preferred apparatus further includes a platform (e.g., slider having an air bearing surface) to which the structure and the (at least one) element are secured, in which the platform is configured to be moved relative to a data recording medium while the separation between the emission region and a surface of the data recording medium is kept to less than the average wavelength. The emission region may be advantageously located at an output face of the laser and may include dielectric material. The optical source may include an optical waveguide coupled to a source of optical radiation. Optical radiation from the optical source preferably has a full width half maximum (FWHM) of less than about 0.1 times the average wavelength of the optical radiation. The optical radiation preferably also includes a frequency that matches a resonant frequency of the structure. The spacing between the features in the metal structure is chosen to enhance the optical output from the emission region from at least one predetermined wavelength, and in one embodiment, the structure may include two features. The (at least one) element that generates magnetic fields may include at least one poling piece for applying a magnetic field in a portion of a storage medium, as the emitted optical output from the emission region heats this portion. --.

Signed and Sealed this

Thirteenth Day of June, 2006

JON W. DUDAS
*Director of the United States Patent and Trademark Office*